(12) United States Patent
Riegel et al.

(10) Patent No.: US 8,794,286 B2
(45) Date of Patent: Aug. 5, 2014

(54) RUN-FLAT TIRE

(75) Inventors: Joachim Riegel, Kahl (DE); Minoru Nishi, Kobe (JP); Anton Haring, Hanau (DE)

(73) Assignees: The Goodyear Tire & Rubber Company, Akron, OH (US); Sumitomo Rubber Industries Ltd., Kobe (JP)

( * ) Notice: Subject to any disclaimer, the term of this patent is extended or adjusted under 35 U.S.C. 154(b) by 933 days.

(21) Appl. No.: 12/738,782

(22) PCT Filed: Sep. 23, 2008

(86) PCT No.: PCT/EP2008/062669
§ 371 (c)(1),
(2), (4) Date: Jun. 28, 2010

(87) PCT Pub. No.: WO2009/053193
PCT Pub. Date: Apr. 30, 2009

(65) Prior Publication Data
US 2010/0263779 A1 Oct. 21, 2010

(30) Foreign Application Priority Data
Oct. 18, 2007 (DE) .......................... 10 2007 049 943

(51) Int. Cl.
*B60C 15/024* (2006.01)
*B60C 17/00* (2006.01)
(52) U.S. Cl.
USPC ........................................................ 152/544
(58) Field of Classification Search
USPC .......................................... 152/517, 539, 544
IPC ..................................................... B60C 15/024
See application file for complete search history.

(56) References Cited

U.S. PATENT DOCUMENTS 5,460,214 A * 10/1995 Fujita et al. .................... 152/540
2004/0187995 A1* 9/2004 Yoshinaka ..................... 152/454

FOREIGN PATENT DOCUMENTS

| EP | 0540492 | | 5/1993 | |
| JP | 54-108302 | * | 8/1979 | ................ B60C 5/12 |
| JP | 54108302 | | 8/1979 | |
| JP | 5077615 | | 3/1993 | |
| JP | 6312605 | | 11/1994 | |
| JP | 06312605 A | * | 11/1994 | ............ B60C 15/024 |
| JP | 2007160983 | | 6/2007 | |
| JP | 2007160983 A | * | 6/2007 | ............ B60C 15/024 |

OTHER PUBLICATIONS

English language machine translation of JP06-312605, 1994.*
English language machine translation of JP2007-160983, 2007.*
International Search Report, Dated Dec. 30, 2008.

* cited by examiner

*Primary Examiner* — Justin Fischer
*Assistant Examiner* — Philip N Schwartz
(74) *Attorney, Agent, or Firm* — June E. Rickey

(57) ABSTRACT

Pneumatic vehicle tire, in particular a run-flat tire, having a carcass, a tread, and two tire beads, having a respective bead core, which are provided for fixing the tire in an associated wheel rim by the fact that the beads overlap with the associated wheel rim. According to the invention, to avoid relative motion between the tire bead and the wheel rim when the tire is subjected to impact load, the bead is designed in such a way in the nonloaded state mounted on the wheel rim the bead does not overlap with the wheel rim in the contact region of the wheel rim flange above the bead core.

9 Claims, 2 Drawing Sheets

RUN-FLAT TIRE

The present invention relates to a pneumatic vehicle tire, in particular a run-flat tire, having a carcass, a tread, and two tire beads, having a respective bead core, which are provided for fixing the tire in an associated wheel rim by the fact that the bead overlaps with the associated wheel rim.

On uneven roadways, pneumatic vehicle tires may be subjected to impacts as the result of deformation of the tire during rolling, the impacts resulting in a relative motion between the tire and the wheel rim, in particular between the tire bead and the associated seating region of the wheel rim. Such a motion influences the steering characteristics and the stability of the vehicle. For run-flat tires these effects occur more frequently due to the reinforced side wall.

The object of the invention is to counteract these effects and to provide a pneumatic vehicle tire whose steering characteristics and driving stability are improved.

This object is achieved by the fact that in the nonloaded state mounted on the wheel rim, at least one bead is designed in such a way that the bead does not overlap with the wheel rim in the contact region of the wheel rim flange above the bead core.

The invention is based on the finding that the relative motion between the tire and the wheel rim is caused primarily by impacts which are transmitted from the wheel rim flange to the oppositely situated contact surface of the tire, whereby on account of the overlap between the tire bead and the wheel rim flange, in conventional tires these forces are essentially concentrated on a single point, and therefore are correspondingly large. Due to the lack of overlap according to the invention, such a concentration of the forces is avoided. The forces exerted by the wheel rim flange on the bead region of the tire during deformation of the rolling tire on an uneven roadway are instead distributed over a fairly large region. In this manner it is possible to decrease the pulse exerted on the bead and at least reduce relative motion between the bead and the wheel rim.

According to one embodiment of the invention, the bead in the base region overlaps with the associated wheel rim, for which purpose the base of the bead in particular defines an angle relative to the associated seating surface of the wheel rim. The overlap in the base region is used to fix the tire on the wheel rim. For the tire according to the invention this is important because the overlap in the region of the wheel rim flange is reduced.

An overlap between the bead and the wheel rim may be achieved by the fact that the base of the bead defines an angle with respect to the associated seating surface of the wheel rim. It is particularly preferred when the base having the seating surface, starting from the heel, initially defines a first angle and then defines a second angle, the second angle being greater than the first angle. In this manner the tire may be fixed on the wheel rim in a particularly satisfactory manner. It has also proven to be particularly advantageous when the transition between the two angles is situated approximately in the middle of the base.

According to a further embodiment of the invention, in the nonloaded state mounted on the wheel rim the bead in the contact region of the wheel rim flange above the bead core is separated at a distance from the wheel rim flange. During rolling of the tire and the deformation thus caused, the bead lies against the wheel rim flange without resulting in excessive, in particular point-focused, compression of the bead. Point forces on the bead are thus avoided in a particularly satisfactory manner.

It is particularly advantageous for the bead to have a design which curves away from the wheel rim flange in the contact region of the wheel rim flange. The curvature of the wheel rim flange is thus taken into account, thus facilitating uniform contact of the bead on the wheel rim flange.

The radius of curvature of the curvature is preferably between approximately 8 mm and approximately 13 mm, particularly preferably approximately 9 mm. For customary wheel rims this radius of curvature has proven to be particularly suitable for achieving a distribution of force and thus avoiding relative motion between the bead and the wheel rim.

According to a further embodiment of the invention, the outer contour of the bead has a pure S shape in the region of the wheel rim flange. This shape on the one hand ensures good contact of the bead against the wheel rim flange, and on the other hand avoids point forces as the result of compressed bead heel regions, which occur, for example, in conventional tires having flanges in the bead region.

The distance between the two maxima of the S shape, viewed in the direction of the tire axis, is preferably between approximately 1.5 mm and approximately 2 mm. The resulting depth of the recess above the bead core has proven to be particularly suitable for uniform contact of the bead on the wheel rim flange. A particularly uniform force distribution and a reduction of relative motion between the bead and the wheel rim may be achieved in this manner.

It has also proven to be particularly suitable when the maximum of the curvature of the bead has a distance of approximately 12 mm to approximately 14 mm from the specified rim diameter of the wheel rim. For customary wheel rims, this position of the curvature is particularly suited for uniform contact of the bead on the wheel rim flange.

One exemplary embodiment of the invention is illustrated in the drawings and is described below. The drawings show the following in schematic illustrations:

Figure 1:
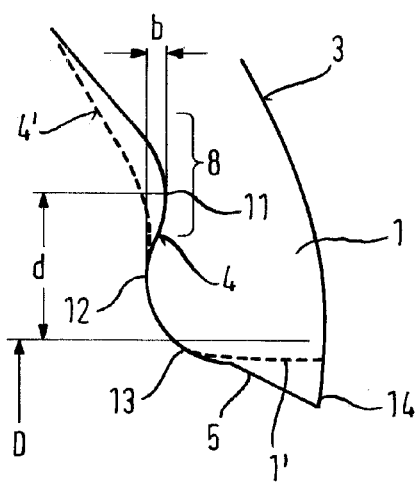
FIG. 1 shows the bead region of a pneumatic vehicle tire according to the invention, in the unmounted state.

The bead region of a pneumatic vehicle tire according to the invention is illustrated by a solid line in FIG. 1. For comparison, the progression of the bead region of a conventional tire is illustrated by a dashed line. It is seen that the contour of the side 3 of the tire bead 1 according to the invention facing away from the wheel rim flange 2 (see FIG. 2) matches the contour of conventional tire beads. In contrast, the side 4 of the tire bead 1 facing the wheel rim flange 2, unlike conventional tire beads, is provided with an S shape. In addition, the base 5 of the tire bead 1 extends at an angle relative to the associated seating region 6 of the wheel rim 7. In particular, the base 5 of the bead according to the invention, starting from the bead heel 13, extends initially at a first angle $\alpha 1$, and then at a second angle $\alpha 2$ relative to the seating region 6 until reaching the bead toe 14, the first angle $\alpha 1$ being smaller than the second angle $\alpha 2$, and the transition between the first angle $\alpha 1$ and the second angle $\alpha 2$ being situated approximately in the middle of the base.

Due to the S-shaped contour of the side 4 of the bead 1 according to the invention facing the wheel rim flange 2, the side 4 of the bead 1 is provided with a curved region 8. The curved region 8 is located essentially above the bead core 9 (see FIG. 2) and in the contact region 10 of the wheel rim flange 2, i.e., in the region in which the side 4 of the bead 1 makes contact when the tire is under load when rolling.

Accordingly, the maximum 11 of the curved region 8 is at a distance d from the wheel rim specified rim diameter D according to ETRTO, which is preferably approximately 12 mm to approximately 14 mm. The radius of curvature of the curved region 8 is preferably approximately 8 mm to approximately 13 mm, in particular approximately 9 mm, and the distance b between the maximum 11 of the curvature in the upper region of the S shape and the directionally opposite maximum 12 in the lower region of the curvature is preferably between approximately 1.5 mm and approximately 2 mm. It may thus be ensured that the side 4 of the bead 1 uniformly contacts the contact region 10 of the wheel rim flange 2 when the tire is under load when rolling. As shown by arrows 15 and 16 in FIG. 2, this results in a substantially uniform distribution of impact forces which arise when the tire rolls on an uneven roadway. Relative motion between the tire bead 1 and the wheel rim 2 is counteracted due to this distribution of the forces.

Figure 2:
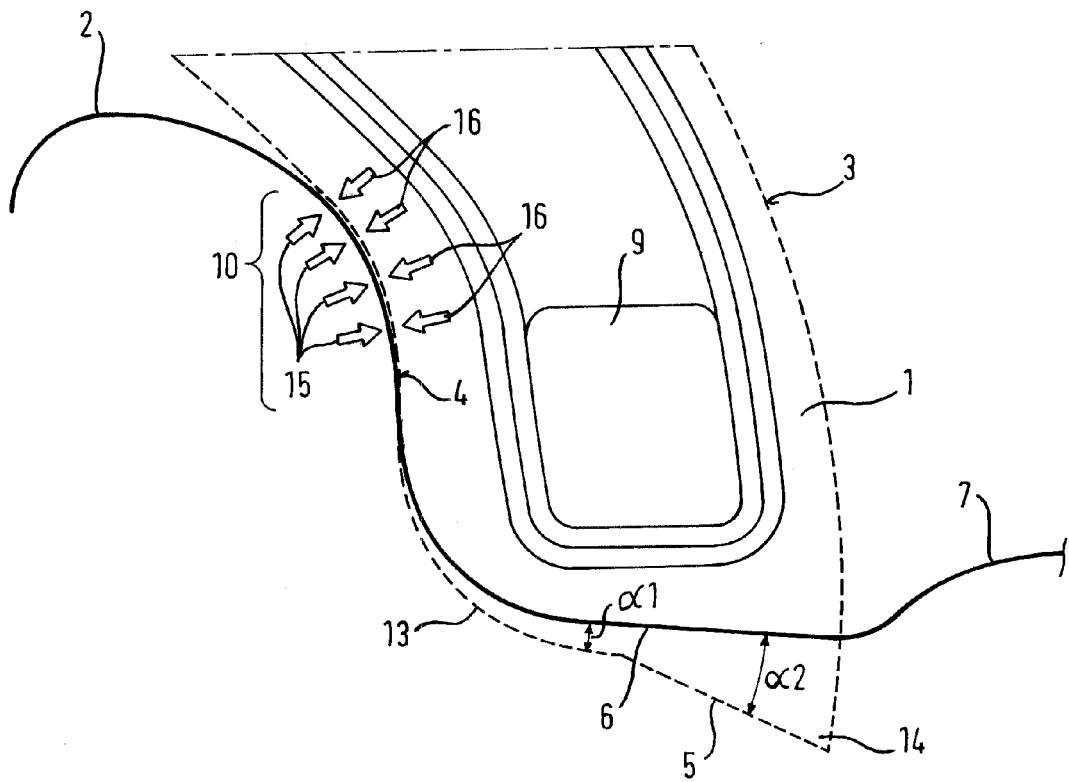
FIG. 2 shows the bead region of a pneumatic vehicle tire in the mounted state, and in enlarged scale compared to FIG. 1.

FIG. 2 shows the wheel rim 7 as a solid line. The contour of the bead 1 in the unmounted but nonloaded state is also illustrated, as a dashed line. It is shown that in the mounted state the bead 1 is compressed in the region of its base 5 due to the fact that the unmounted bead 1 and the wheel rim 7 overlap one another. This results in a retaining force between the tire bead 1 and the wheel rim 7. However, even in the loaded state there is little or no compression in the contact region 10 of the wheel rim flange 2. As a result, in the nonloaded state the side 4 of the bead 1 in the region 8 oppositely situated from the contact region 10 of the wheel rim flange 2 is separated at a distance from the wheel rim flange 2, and under load makes uniform contact with the contact region 10. Thus, in this region no overlap is present between the bead 1 and the wheel rim flange 2.

Figure 3:
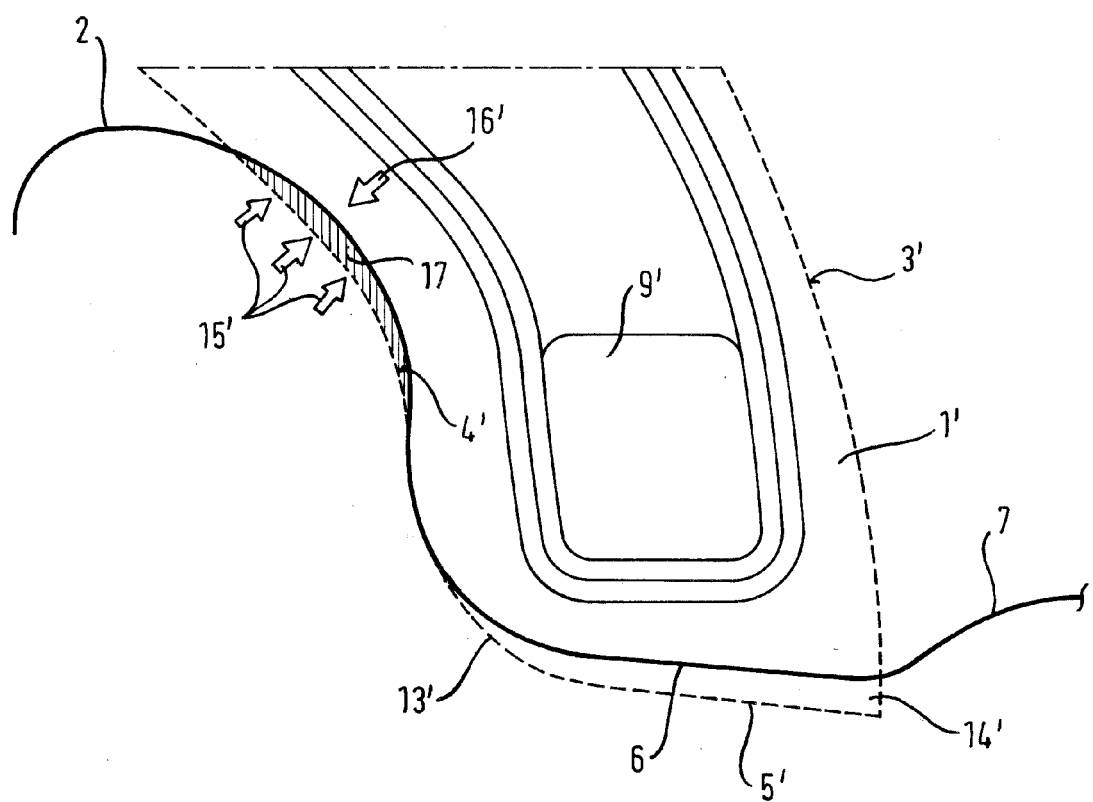
FIG. 3 shows an illustration, corresponding to FIG. 2, of a conventional pneumatic vehicle tire.

In contrast, for the conventional tire illustrated in FIG. 3, an overlap is present according to the crosshatched region 17, at least in the loaded state. This causes the bead 1' to be compressed at this location, thus allowing generation of point forces according to arrow 16' when the tire rolls on an uneven roadway.

LIST OF REFERENCE SYMBOLS 1, 1' Bead
2 Wheel rim flange
3, 3' Side of 1
4, 4' Side of 1
5, 5' Base
6 Wheel rim seat
7 Wheel rim
8 Region
9, 9' Bead core
10 Region
11 Maximum
12 Maximum
13, 13' Bead heel
14, 14' Bead toe
15, 15' Arrow
16, 16' Arrow
17 Overlap region
b Distance
d Distance
D Specified rim diameter of wheel rim
$\alpha 1$ First angle
$\alpha 2$ Second angle

The invention claimed is:

1. A pneumatic tire and rim assembly comprising a carcass, a tread, and two tire beads, each tire bead having a respective bead core which are provided for fixing the tire on an associated wheel rim by the fact that the beads overlap with the associated wheel rim, wherein:

at least one bead is designed in such a way that in a nonloaded state where the pneumatic tire is mounted on the wheel rim and the pneumatic tire and rim assembly is not under load, the bead does not overlap with the wheel rim in the contact region of the wheel rim flange above the bead core, an outer contour of the bead has a S shape in the region of the wheel flange on the side facing the wheel rim flange, a distance between a first and second maxima of the S shape outer contour is in the range of 1.5 mm to 2 mm, and in said nonloaded state where the pneumatic tire is mounted on the wheel rim and the pneumatic tire and rim assembly is not under load, the bead in the contact region of the wheel rim flange above the bead core is separated at a distance from the wheel rim flange.

2. The pneumatic vehicle tire and rim assembly according to claim 1, wherein the bead overlaps with the associated wheel rim in the region of the base of the bead.

3. The pneumatic vehicle tire and rim assembly according to claim 2, wherein the base of the bead defines an angle ($\alpha$) relative to the associated seating surface of the wheel rim.

4. The pneumatic vehicle tire and rim assembly according to claim 3, wherein the base has a seating surface, starting from the heel, initially defines a first angle ($\alpha 1$) and then defines a second angle ($\alpha 2$), the second angle ($\alpha 2$) being greater than the first angle ($\alpha 1$).

5. The pneumatic vehicle tire and rim assembly according to claim 4, wherein the transition between the first angle ($\alpha 1$) and the second angle ($\alpha 2$) is situated approximately in the middle of the base.

6. The pneumatic vehicle tire and rim assembly according to claim 1, wherein the bead has a larger radius of curvature than the radius of curvature of the wheel rim flange in the contact region of the wheel rim flange.

7. The pneumatic vehicle tire and rim assembly according to claim 6, wherein the curvature is designed in such a way that the bead uniformly contacts the contact region of the wheel rim flange when the tire is under load.

8. The pneumatic vehicle tire and rim assembly according to claim 6, wherein the curvature has a radius of curvature of approximately 8 mm to approximately 13 mm.

9. The pneumatic vehicle tire and rim assembly according to claim 1, wherein the upper maximum of the curvature has a distance (d) of approximately 12 mm to approximately 14 mm from the specified rim diameter (D) of the wheel rim.

* * * * *